June 21, 1960 J. A. HUNT 2,941,746
MACHINE FOR REELING ELECTRIC CABLE
Filed Dec. 16, 1957 3 Sheets-Sheet 1

INVENTOR.
James A. Hunt,
BY Paul & Paul
ATTORNEYS.

June 21, 1960  J. A. HUNT  2,941,746
MACHINE FOR REELING ELECTRIC CABLE
Filed Dec. 16, 1957  3 Sheets-Sheet 2

INVENTOR.
James A. Hunt,
BY Paul & Paul
ATTORNEYS.

United States Patent Office 2,941,746
Patented June 21, 1960

2,941,746
MACHINE FOR REELING ELECTRIC CABLE

James A. Hunt, Union, N.J., assignor to Joseph D. Dawkins, Garden City, N.Y.

Filed Dec. 16, 1957, Ser. No. 703,064

3 Claims. (Cl. 242—82)

This invention relates to improvements in a machine for winding and unwinding an electric cable, and more particularly concerns a machine for winding and unwinding an electric cable about a cable reel without twisting the cable and without disconnecting the cable from its electric circuit.

It has heretofore been proposed to wind electric cable about a cable reel without disconnecting the cable from its electric circuit. It has also been attempted to wind the cable about the cable reel in a level manner without twisting the cable. However, previous machines have not proved entirely satisfactory. For example, one such machine used a screw and a travelling sheave in its winding arm to guide the cable onto the reel in a level manner. However, the screw and travelling sheave had a blind spot so that when the direction of rotation of the travelling sheave and winding arm was reversed at the same time, the machine jammed.

Another disadvantage of the heretofore proposed machines was that when unwinding the cable, after all the cable had been played out from the reel, the winding arm would continue to rotate and tend to wind the cable backwards onto the reel and would cut the cable. Accordingly, it is the object of this invention to overcome the aforementioned problems and disadvantages.

It is another object of this invention to provide a machine for winding and unwinding electric cable without twisting the cable or disconnecting it from its electric circuit. It is another object to provide a machine of this nature which may be reversed at any time and as many times as desirable during winding or unwinding. It is another object to provide such machine which is simple to build and to maintain. It is another object to provide such a machine which prevents backward winding and accidental cutting of the cable caused thereby.

Other objects and advantages of this invention will further become apparent hereinafter and in the drawings, in which.

Figure 1:
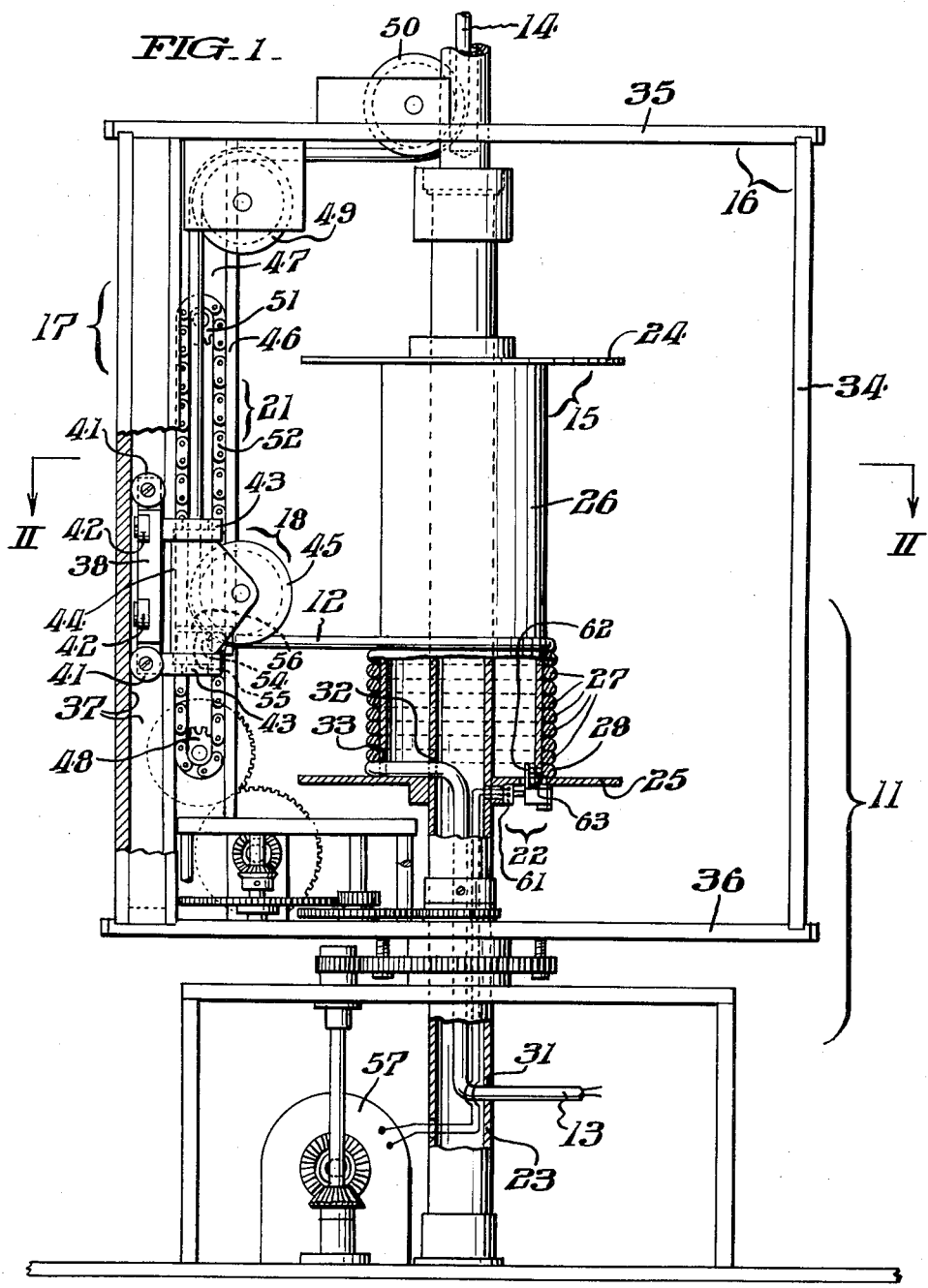
Fig. 1 is a view in side elevation of a machine constructed in accordance with this invention with parts broken away in order to illustrate important details.
Figure 2:
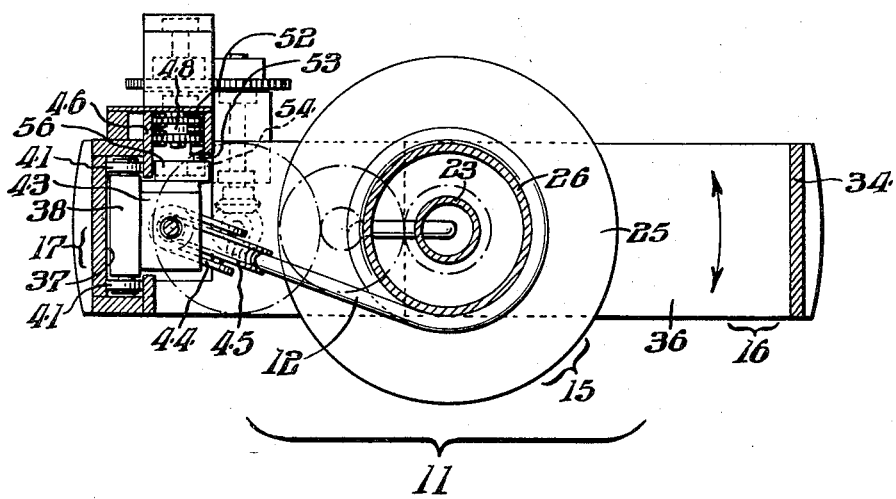
Fig. 2 is a view in section taken as indicated by the lines and arrows II—II which appear in Fig. 1.
Figure 3:
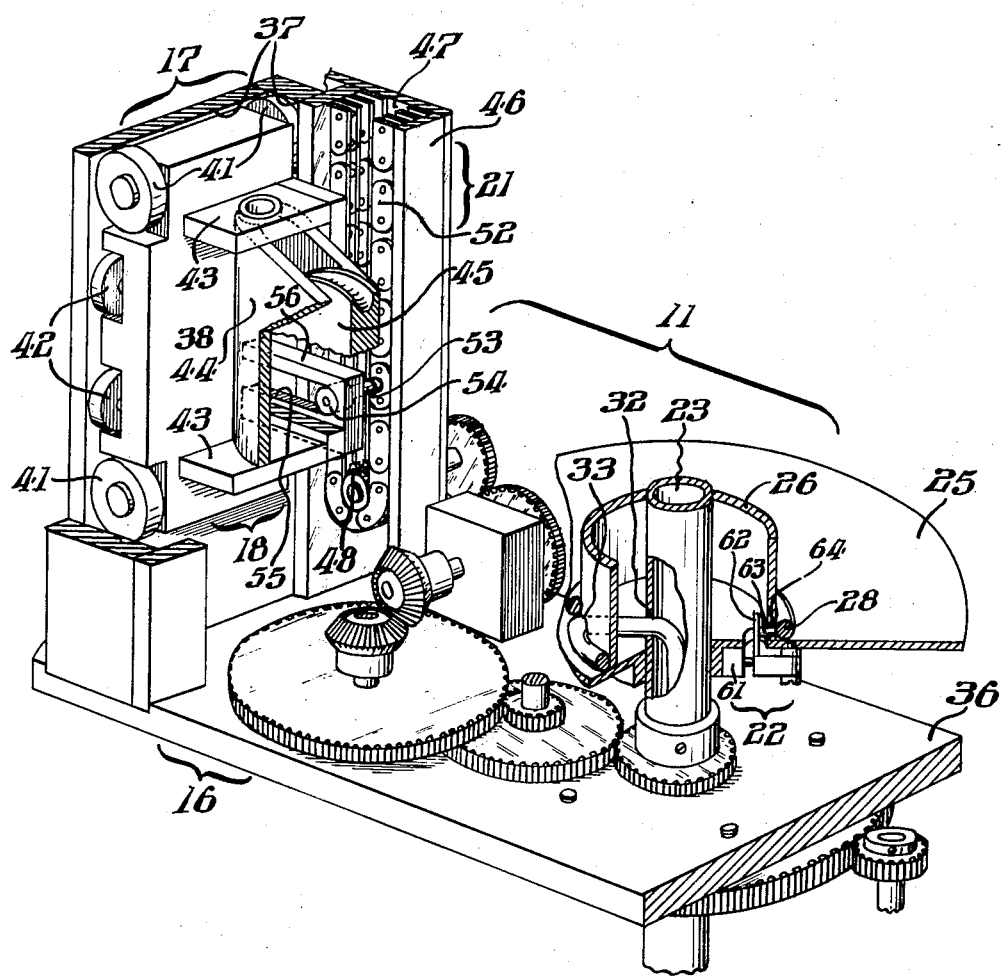
Fig. 3 is a fragmentary view in perspective of the gearing and the cable guiding means which is an element of the invention.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawings, the number 11 designates generally a machine for winding and unwinding an electric cable 12 without disconnecting the cable from its electric circuit. Electric cable 12 has a fixed end 13 which extends to an electrical circuit (not shown) including a source of power and measuring instruments as desired. Cable 12 also has a moveable end 14 which has positioned thereon a sensing instrument (not shown) which may be extended away from machine 11 to any desired location. One purpose of the present invention is to provide for the positioning of the sensing instrument at various locations and at various distances from machine 11 and to provide for level winding the cable which is unused when the sensing instrument is positioned at various points. This level winding is accomplished without twisting the cable and without disconnecting it from its electric circuit.

Machine 11 includes a cable reel 15, a rotatable frame 16 including a winding arm 17 which is spaced away from and rotatable about the axis of reel 15, cable guiding means 18 which is moveable up and down on winding arm 17, control means 21 which controls the position of cable guiding means 18, and stop means 22 which prevents rotation of arm 17 in the unwinding direction when the cable 12 has been completely unwound from the reel 15.

Cable reel 15 is rigidly mounted on a fixed tubular support 23 and includes flanges 24 and 25 and a cylindrical portion 26 on which cable 12 is wound to form rungs 27 and bottom rung 28. Fixed end 13 of cable 12 enters tubular column 23 through an aperture 31, passes upwardly through tubular support 23 and exits therefrom through aperture 32, and passes through cylindrical portion 26 through aperture 33.

Frame 16 includes winding arm 17 and arm 34 which are joined together by upper support 35 and lower support 36. Supports 35 and 36 are rotatably connected to fixed tubular support 23. Arm 17 is provided with a track 37 in which ride elements of the cable guiding means 18.

Cable guiding means 18 includes a carriage 38 having end rollers 41 and side rollers 42 which ride in track 37 of winding arm 17. Mounted on carriage 38 are brackets 43 which pivotally support a swinging saddle 44 which rotatably supports a grooved sheave 45. Carriage 18 rides up and down within track 37 and cable 12 passes over sheave 45 which is properly positioned to level wind the cable onto the cylindrical portion 26 of reel 15.

Control means 21 includes a vertically positioned housing 46 mounted between upper support 35 and lower support 36 and having formed therein a track 47. Mounted within housing 46 is a drive sprocket 48 and an idler sprocket 51 around which is trained a double sprocket, small diameter chain 52. Extending from chain 52 is a finger 53 having a roller bearing 54 on its end which operatively engages within a slot 55 within a block 56 which is mounted on carriage 38. The arrangement of finger 53 having roller bearing 54 within slot 55 is provided to accommodate the substantially horizontal motion of finger 53 as it passes over idler sprocket 51 and as it passes under drive sprocket 48.

Drive sprocket 48 and frame 16 are driven through the gearing shown by motor 57 which has a separate start-stop switch (not shown). The gear ratio of gearing may be changed as desired to accommodate various sizes of cable. In practice, it has been found desirable to arrange the gear ratio such that sheave 45 is always positioned to guide the cable 12 to reel 15 in a substantially horizontal path.

Stop means 22 is provided so that when the cable 12 is fully unwound from the reel 15, the arm 17 will not continue to wind in the unwinding direction. Such action on the part of arm 17 would tend to rewind reel 15 in the opposite direction and would also tend to cut cable 12 at the aperture 33 of cylindrical portion 26. To prevent this, stop means 22 is provided and it includes a micro snap-action switch 61 which is mounted on the bottom of reel flange 25 and which includes an arm 62 which is connected to a button 63 which protrudes through an aperture 64 in cylindrical portion 26 to contact lower rung 28 of cable 12. When such contact is made, the switch is closed. However, when such contact is broken, switch 61 is opened and this opens the electrical circuit to shut down motor 57, thus preventing the undesirable rewinding in the opposite direction and the cutting of cable 12.

In operation, motor 57 is turned on and the cable 12 is unwound from reel 15 through the rotation of winding arm 17 about the cable reel 15. Cable 12 is guided out through and around sheave 45 and upwardly through sheaves 49 and 50. As cable 12 plays out, carriage 38 is moved to a position that insures the horizontal delivery of the cable from reel 15 to sheaves 45. As one layer of rungs 27 is removed from reel 15, that is as the layer is removed from the bottom progressing toward the top of reel 15, finger 53 passes over the top of idler sprocket 51 in a smooth fashion without jamming the apparatus. This is accomplished through the cooperation of finger roller bearing 54 within slot 55. The same smooth change of direction is accomplished as finger 53 passes beneath drive sprocket 48. If the cable 12 should become completely unwound from reel 15, the lowest rung 28 unwinds to release button 63 to open the circuit to motor 57 and shut down the motor. Preferably, the cable 12 is never completely unwound so that the cable can be reeled in and out continuously. However, stop means 22 is provided as a safety measure.

The operation of reeling in cable 12, is very similar to that of reeling it out. It is to be noted that machine 11 is reversible at any time from winding to unwinding and vice versa, and that its versatility of control is accomplished without any danger of jamming the apparatus.

The advantages of the machine are numerous and it is especially adapted for use on board ship where a sensing instrument is dropped over the side and positioned at various depths in the water, with the intelligence obtained by the sensing instrument being transferred through cable 12 to measuring instruments which are located at a fixed point on the ship. This winding and unwinding of the electric cable is accomplished without twisting the electric cable or disconnecting the circuit. The cable is level wound around the cable reel 15. The apparatus further provides reversing the direction of cable travel at any time and as many times as is desirable. Another advantage of micro switch 61 and its stop means circuit is that it is also used as a signal, or as an automatic shut-off, or as indicating means to other instruments that are positioned in the electric circuit.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, and certains features of the invention may be utilized independently of the use of other features, all without departing from the spirit or scope of the invention as defined in the subjoined claims. Machines constructed in accordance with this invention may have flexible tubing substituted for the electrical cable heretofore described. Such machines are utilized for the transmission of liquids, for example, the refueling with gasoline of an airplane in flight from another airplane. Accordingly, it is to be understood that the term electrical cable as used in the subjoined claims includes such equivalents, for the purposes of the machine of this invention, as flexible tubing, rope, and the like.

Having thus described my invention, I claim:

1. Electric cable apparatus comprising a support, a cable reel fixedly mounted on said support, an electric cable connected in an electric circuit and having one end passing through said support to and around said reel and the other end free to wind and unwind from said reel, a winding arm rotatably connected to said support and spaced away from the axis of the reel, cable guiding means positioned on the winding arm for guiding the electric cable onto and off the reel without twisting it or disconnecting it from the electric circuit, power means connected to the winding arm for rotating said arm around said cable reel, said power means also being connected to said cable guiding means for moving said cable guiding means up and down on said winding arm for level winding said electric cable onto said reel, said power means being reversible for reversing the direction of travel of said cable guiding means at any point on said winding arm, and automatically operated stop means mounted on said cable reel and connected to said power means and operative in response to the position of said cable for preventing the rotation of said winding arm in the unwinding direction when the electric cable has been unwound from said reel without disturbing the end of the electric cable on said cable reel and without disturbing said electric circuit.

2. The electric cable apparatus defined in claim 1, wherein said cable guiding means includes a wheeled carriage, said winding arm having a track formed therein parallel to the axis of said cable reel, said wheeled carriage being positioned in said track for raising and lowering, a swinging saddle pivotally mounted on said carriage along an axis parallel to the axis of said cable reel, a sheave rotatably mounted in said saddle on a horizontal axis, a block mounted on the carriage and having a horizontal slot formed therein, a sprocket chain mounted on spaced apart sprockets on said winding arm for driving said carriage, and a finger extending from said sprocket chain into said slot for raising and lowering said carriage in response to movement of said sprocket chain, said slot accommodating the horizontal movement of the sprocket chain as it moves over and under said spaced sprockets.

3. The electric cable apparatus defined in claim 1, wherein said stop means includes a micro snap-action switch mounted on said fixedly mounted cable reel and connected in electrical circuit with said power means, button means mounted on said switch and projecting outwardly from the cylindrical portion of said cable reel and contacted and depressed by the lower rung of the cable on the reel to maintain the switch in closed position, said switch opening when said lower rung of cable is unwound from said cable reel for opening the electrical circuit to said power means to halt rotation of said winding arm.

References Cited in the file of this patent
UNITED STATES PATENTS

| | | |
|---|---|---|
| 132,155 | Hayes | Oct. 15, 1872 |
| 1,772,548 | Levin | Aug. 12, 1930 |
| 1,935,585 | Tornblom | Nov. 14, 1933 |
| 2,227,303 | Flaws | Dec. 31, 1940 |